US008130748B2

(12) United States Patent
Jung et al.

(10) Patent No.: US 8,130,748 B2
(45) Date of Patent: Mar. 6, 2012

(54) TRANSMITTER CIRCUIT TO COMPENSATE FOR INFLUENCE OF CROSSTALK NOISE IN PRE-EMPHASIS SCHEME

(75) Inventors: Hae Kang Jung, Pohang-si (KR); Hong June Park, Pohang-si (KR); Kyoung Ho Lee, Pohang-si (KR)

(73) Assignee: Postech Academy Industry Foundation, Pohang-si, Gyeongsangbuk-do (KR)

( * ) Notice: Subject to any disclaimer, the term of this patent is extended or adjusted under 35 U.S.C. 154(b) by 268 days.

(21) Appl. No.: 12/512,904

(22) Filed: Jul. 30, 2009

(65) Prior Publication Data

US 2010/0074095 A1     Mar. 25, 2010

(30) Foreign Application Priority Data

Sep. 25, 2008    (KR) ........................ 10-2008-0093960

(51) Int. Cl.
     *H04L 12/28*        (2006.01)
(52) U.S. Cl. ........................................................ 370/351
(58) Field of Classification Search .................... None
See application file for complete search history.

(56) References Cited

U.S. PATENT DOCUMENTS

| 5,396,618 | A | * | 3/1995 | Fukui et al. ...................... 714/30 |
| 6,885,752 | B1 | * | 4/2005 | Chabries et al. ............... 381/321 |
| 7,894,491 | B2 | * | 2/2011 | Batty et al. ..................... 370/537 |
| 2009/0081969 | A1 | * | 3/2009 | Milijevic et al. ........... 455/114.2 |

* cited by examiner

*Primary Examiner* — Ayaz Sheikh
*Assistant Examiner* — Blanche Wong
(74) *Attorney, Agent, or Firm* — Kile Park Goekjian Reed & McManus PLLC (57) ABSTRACT

A transmitter circuit for transmitting parallel data, suitable for compensating for influence of crosstalk noise in a pre-emphasis scheme. The transmitter circuit includes first through $N^{th}$ transmission lines configured to respectively transmit first through $N^{th}$ data (N is 2 or greater); first through $N^{th}$ output driving circuit sections configured to output the first through $N^{th}$ data transmitted through the first through $N^{th}$ transmission lines; first through $N^{th}$ pre-emphasis circuit sections configured to generate first through $N^{th}$ pre-emphasis signals for controlling transition output levels of the first through $N^{th}$ data depending upon signal modes of adjoining data among the first through $N^{th}$ data; and first through $N^{th}$ adders configured to generate first through $N^{th}$ data output signals that are controlled in transition output levels using output signals of the first through $N^{th}$ output driving circuit sections and the first through $N^{th}$ pre-emphasis signals.

17 Claims, 10 Drawing Sheets

TRANSMITTER CIRCUIT TO COMPENSATE FOR INFLUENCE OF CROSSTALK NOISE IN PRE-EMPHASIS SCHEME

BACKGROUND OF THE INVENTION

1. Field of the Invention

The present invention relates to a transmitter circuit for reducing crosstalk noise of a receiver, that is generated in the case of transmitting a number of high speed signals in parallel, and more particularly, to a transmitter circuit which compensates for influence of crosstalk noise in a pre-emphasis scheme by estimating far-end crosstalk noise of a receiver generated due to electromagnetic coupling of other adjoining transmission lines when transmitting a number of high speed signals in parallel.

2. Description of the Related Art

In the case of transmitting a number of high speed signals through microstrip transmission lines on a printed circuit board, etc., timing jitter is induced under influence of crosstalk noise generated due to a difference between a capacitive coupling coefficient and an inductive coupling coefficient.

Crosstalk noise indicates a phenomenon by electromagnetic coupling of respective signal lines, and means noise that is generated as signals on different transmission lines influence adjoining transmission lines by coupling such as electrostatic coupling, electromagnetic coupling, and so forth. That is to say, when a number of transmission lines exist in parallel and data passing through the transmission lines transit from a high level to a low level or from a low level to a high level, jitter is induced due to crosstalk, noise generated by a difference between mutual inductance and mutual capacitance.

Figure 1A:
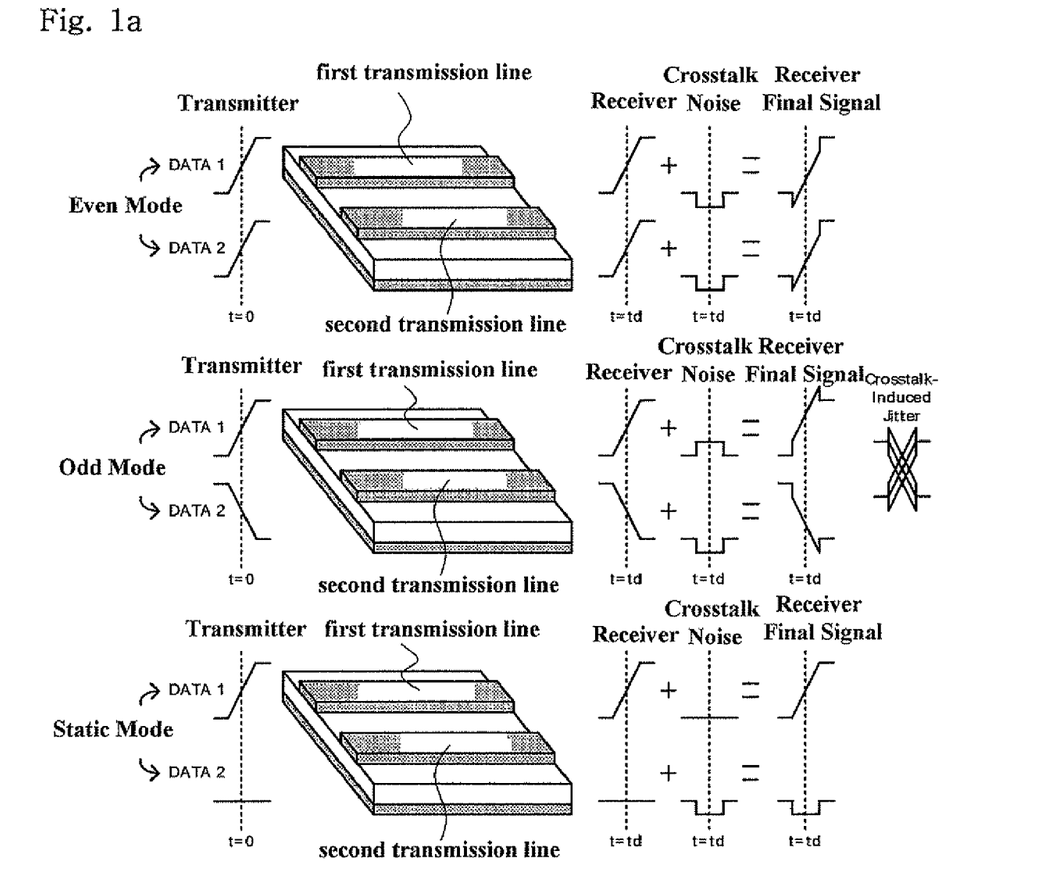
FIG. 1a is a conceptual waveform diagram in a transmitter and a receiver in the case where a conventional transmitter is used in microstrip transmission lines on a printed circuit board.

FIG. 1a is a conceptual waveform diagram in a transmitter W and a receiver in the case where a conventional data transmission method is used in microstrip transmission lines on a printed circuit board.

In the case of strip transmission lines, since a capacitive coupling coefficient and an inductive coupling coefficient are equal to each other, crosstalk noise becomes 0. However, in the case of microstrip transmission lines which are formed on a printed circuit board, since an inductive coupling coefficient is greater than a capacitive coupling coefficient, crosstalk noise of a receiver has a negative value.

As shown in the drawing, in the case where two transmission lines exist in parallel, data DATA1 and DATA2 reach a data receiver in a state in which they are delayed by different delay amounts under influence of crosstalk noise generated depending upon whether or not the data DATA1 and DATA2 passing through transmission lines transit and to which direction the data DATA1 and DATA2 transit. The difference in delay amount can be expressed as in the following Mathematical Expression 1.

$$T_{de} - T_{do} = \sqrt{L_s C_t} \left( \frac{L_m}{L_s} - \frac{C_m}{C_t} \right) \quad \text{[Mathematical Expression 1]}$$

Here, $T_{de}$ designates a transmission time when the transition directions of the data DATA1 and DATA2 are the same, and $T_{do}$ designates a transmission time when the data DATA1 and DATA2 transit in opposite directions. $L_s$ designates a self-inductance, $L_m$ a mutual inductance, $C_m$ a mutual capacitance, and $C_t$ the sum of a self-capacitance and a mutual capacitance.

There are three modes including an odd mode in which the transition directions of the data DATA1 and DATA2 are different, an even mode in which the transition directions of the data DATA1 and DATA2 are the same, and a static mode in which no one of the data DATA1 and DATA2 transits.

When applied signals increase with respect to time, since crosstalk noise in a receiver becomes the shape of a negative pulse, the crosstalk noise in the receiver delays signal change with respect to time in the even mode and accelerates signal change with respect to time in the odd mode. Accordingly, in the odd mode, the data DATA1 and DATA2 are transmitted by being delayed least, and in the even mode, the data DATA1 and DATA2 are transmitted by being delayed most.

Figure 1B:
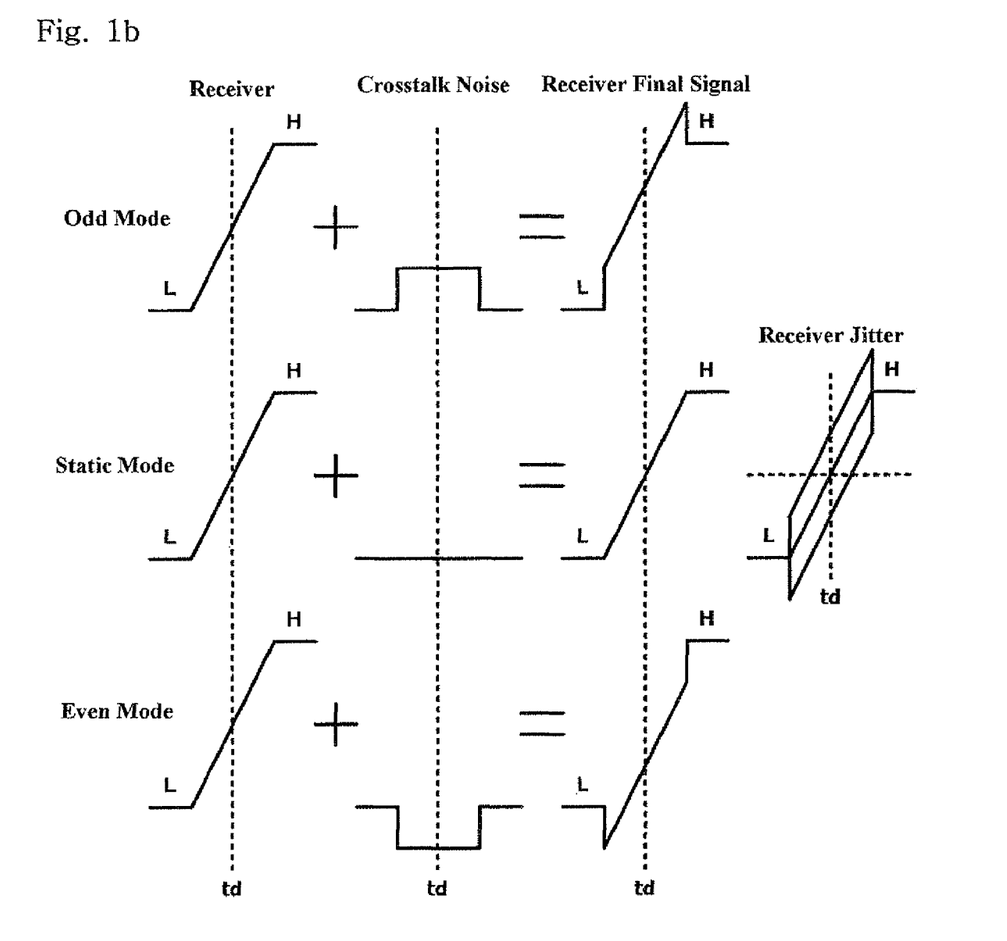
FIG. 1b is a conceptual waveform diagram in a receiver in the case where a conventional transmitter is used when an inductive coupling coefficient is greater than a capacitive coupling coefficient.

FIG. 1b is a timing diagram of a conventional data transmission circuit.

In the conventional art, as shown in FIG. 1b, in a data receiver, in the case of the odd mode in which the transition directions of data are different, when data transits to a high level, since a counterpart signal transits to a low level, crosstalk noise is generated in a positive direction, whereby a receiver final signal reaches earliest. In the case of the static mode, when data transits to a high level, since a counterpart signal does not transit, crosstalk noise is not generated, whereby a receiver final signal reaches intermediately. In the case of the even mode, when data transits to a high level, since a counterpart signal also transits to a high level, crosstalk noise is generated in a negative direction, whereby a receiver final signal reaches latest. Therefore, jitter is induced in the receiver due to the crosstalk noise.

Conversely, when a capacitive coupling coefficient is greater than an inductive coupling coefficient, data DATA1 and DATA2 reach a data receiver in a state in which they are delayed under influence of crosstalk noise generated depending upon whether or not the data DATA1 and DATA2 passing through transmission lines transit and to which direction the data DATA1 and DATA2 transit. The difference in delay amount can be expressed as in the following Mathematical Expression 2.

$$T_{do} - T_{de} = \sqrt{L_s C_t} \left( \frac{C_m}{C_t} - \frac{L_m}{L_s} \right) \quad \text{[Mathematical Expression 2]}$$

The Mathematical Expression 2 represents a case in which the signs of the Mathematical Expression 1 are reversed. In other words, when a capacitive coupling coefficient is greater than an inductive coupling coefficient, in the odd mode, the data DATA1 and DATA2 are transmitted by being delayed most, and in the even mode, the data DATA1 and DATA2 are transmitted by being delayed least.

As a consequence, in the conventional art, when an inductive coupling coefficient is not only greater but also less than a capacitive coupling coefficient, crosstalk noise is generated between the data DATA1 and DATA2 depending upon whether or not the data DATA1 and DATA2 transit and to which direction the data DATA1 and DATA2 transit, whereby the data DATA1 and DATA2 reach the data receiver with a difference in delay amount. Due to this fact, a problem is caused in that jitter is induced in the data receiver, and resultantly, as a time margin of the data DATA1 and DATA2 decreases, high speed signal transmission is impeded.

SUMMARY OF THE INVENTION

Accordingly, the present invention has been made in an effort to solve the problems occurring in the related art, and an object of the present invention is to provide a transmitter circuit which compensates for influence of crosstalk noise in a pre-emphasis scheme by controlling the level of a transition output depending upon a signal mode of data transmitted through a transmission line when transmitting a number of high speed signals in parallel, so that jitter induced due to signal interference characteristics between transmission lines can be reduced.

In order to achieve the above object, according to one aspect of the present invention, there is provided a transmitter circuit for transmitting parallel data, suitable for compensating for influence of crosstalk noise in a pre-emphasis scheme, comprising first through $N^{th}$ transmission lines configured to respectively transmit first through $N^{th}$ data (N is 2 or greater); first through $N^{th}$ output driving circuit sections configured to output the first through $N^{th}$ data transmitted through the first through $N^{th}$ transmission lines; first through $N^{th}$ pre-emphasis circuit sections configured to generate first through $N^{th}$ pre-emphasis signals for controlling transition output levels of the first through $N^{th}$ data depending upon signal modes of adjoining data among the first through $N^{th}$ data; and first through $N^{th}$ adders configured to generate first through $N^{th}$ data output signals that are controlled in transition output levels using output signals of the first through $N^{th}$ output driving circuit sections and the first through $N^{th}$ pre-emphasis signals.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Reference will now be made in greater detail to preferred embodiments of the invention, examples of which are illustrated in the accompanying drawings. Wherever possible, the same reference numerals will be used throughout the drawings and the description to refer to the same or like parts.

Figure 2:
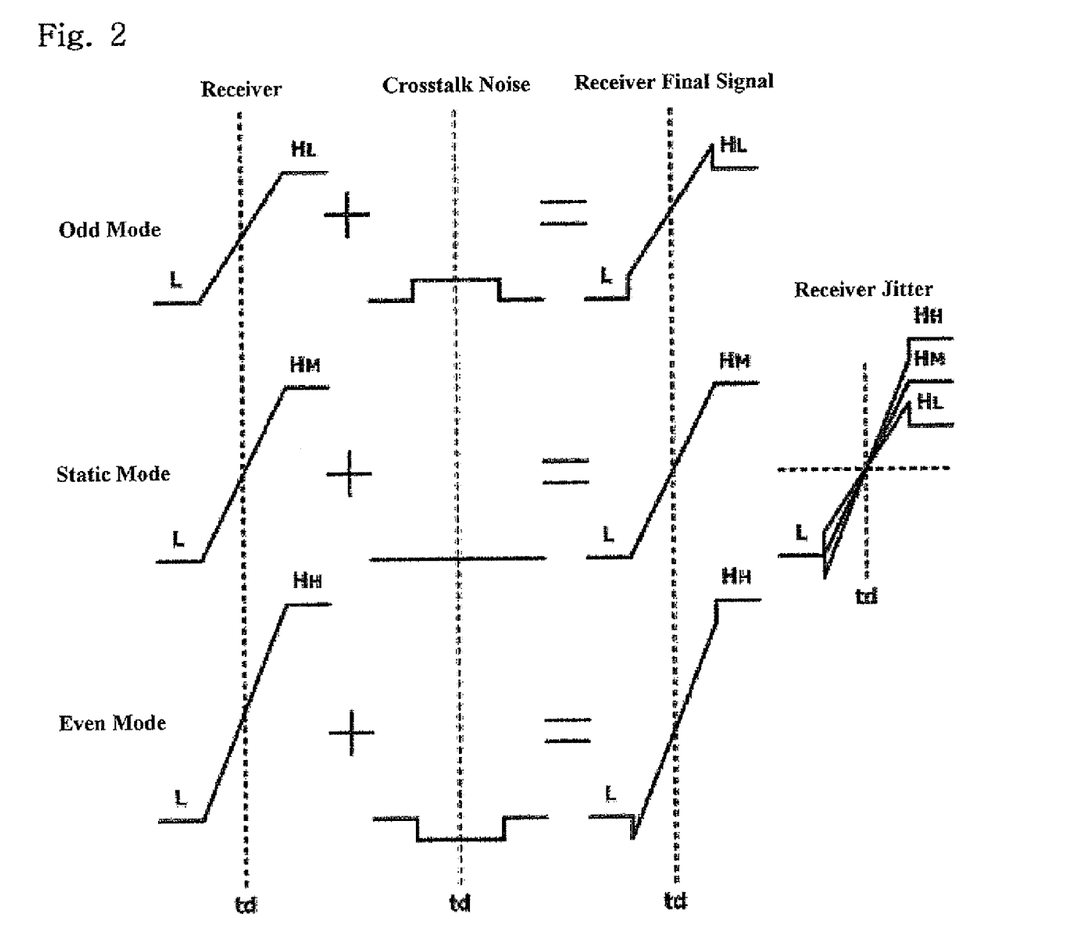
FIG. 2 is a conceptual waveform diagram in a receiver in the case where a transmitter according to the present invention is used when an inductive coupling coefficient is greater than a capacitive coupling coefficient.

FIG. 2 is a timing diagram of a data transmission circuit in accordance with an embodiment of the present invention.

Referring to FIG. 2, when transmitting data, a data transmission circuit in accordance with an embodiment of the present invention outputs data by differentiating a transition output level of the data depending upon a signal mode of the data. In the case of an odd mode, since positive crosstalk noise will be added, a level of data is made less than a high level H and data is outputted as a high-low level HL, and in the case of an even mode, since negative crosstalk noise will be added, a level of data is made greater than an original high level H and data is outputted as a high-high level HH. In this way, by transmitting data after compensating, in advance, for influence of crosstalk in a transmitter, timing jitter due to crosstalk noise can be reduced in a receiver. When data is transmitted by controlling a transition level by a magnitude corresponding to two times the crosstalk noise, the timing jitter due to the crosstalk noise can be made theoretically to 0.

Figure 3:
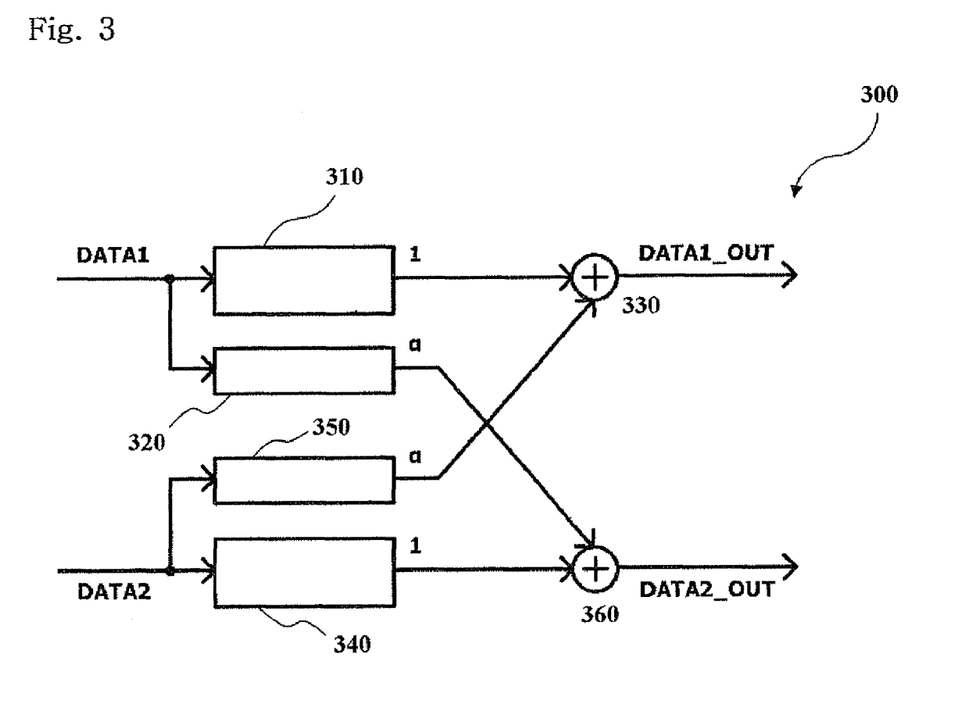
FIG. 3 is a block diagram illustrating a transmitter circuit having two data transmission lines in accordance with an embodiment of the present invention.

FIG. 3 is a block diagram illustrating a transmitter circuit having two data transmission lines in accordance with an embodiment of the present invention.

Referring to FIG. 3, a transmitter circuit 300 for compensating for influence of crosstalk noise in a pre-emphasis scheme in accordance with an embodiment of the present invention includes two output driving circuit sections 310 and 340 which transmit two data DATA1 and DATA2, two pre-emphasis circuit sections 320 and 350 which generate pre-emphasis signals capable of controlling output transition levels of output signals depending upon signal modes in relation to counterpart output signals when the respective data transit, and two adders 330 and 360 which combine the output signals of the output driving circuit sections 310 and 340 and the pre-emphasis signals and generate data output signals DATA 1_OUT and DATA2_OUT.

As shown in FIG. 3, in the transmitter circuit 300 for compensating for influence of crosstalk noise in a pre-emphasis scheme in accordance with the embodiment of the present invention, when transmitting the two data DATA1 and DATA2, in order to generate the first data output signal DATA1_OUT, the second pre-emphasis circuit section 350 generates a second pre-emphasis signal using the second data signal DATA2 depending upon a signal mode between the first data signal DATA1 and the second data signal DATA2. Then, by adding the second pre-emphasis signal to the output signal of the first output driving circuit section 310 to an appropriate proportion, the first data output signal DATA1_OUT is generated.

Conversely, in order to generate the second data output signal DATA2_OUT, a first pre-emphasis signal generated using the first DATA1 is added to the output signal of the second output driving circuit section 340, so that the second data output signal DATA2_OUT can be outputted.

Figure 4:
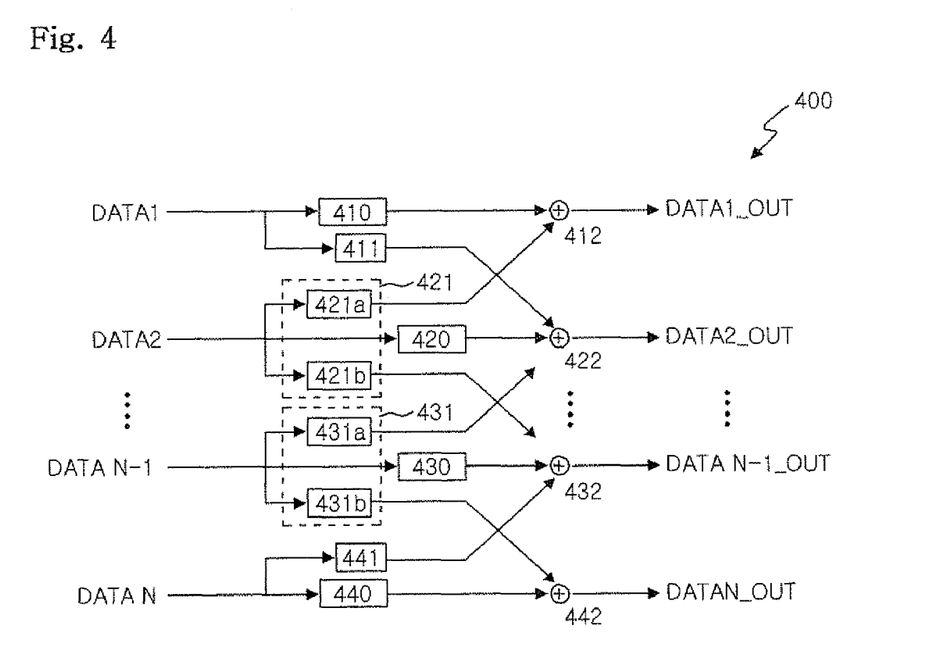
FIG. 4 is a block diagram illustrating a transmitter circuit having N number of data transmission lines in accordance with another embodiment of the present invention.

FIG. 4 is a block diagram illustrating a transmitter circuit having N number of data transmission lines in accordance with another embodiment of the present invention.

Referring to FIG. 4, a transmitter circuit for compensating for influence of crosstalk noise in a pre-emphasis scheme in accordance with another embodiment of the present invention includes first through $N^{th}$ transmission lines which transmit first through $N^{th}$ (N is 2 or greater) data, first through $N^{th}$ output driving circuit sections 410, 420, 430 and 440 which output the first through $N^{th}$ data transmitted through the first through $N^{th}$ transmission lines, first through $N^{th}$ pre-emphasis circuit sections 411, 421, 431 and 441 which generate first through $N^{th}$ pre-emphasis signals for controlling transition output levels of the first through $N^{th}$ data depending upon signal modes of adjoining data among the first through $N^{th}$ data, and first through $N^{th}$ adders 412, 422, 432 and 442 which generate first through $N^{th}$ data output signals that are controlled in transition output levels using the output signals of the first through $N^{th}$ output driving circuit sections and the first through $N^{th}$ pre-emphasis signals.

Hereinbelow, a procedure of generating the pre-emphasis signals in the first through $N^{th}$ pre-emphasis circuit sections 411, 421, 431 and 441 and a procedure of generating the first through $N^{th}$ data output signals using the pre-emphasis signals will be described in each of the cases where an inductive coupling coefficient is greater and less than a capacitive coupling coefficient.

Figure 5:
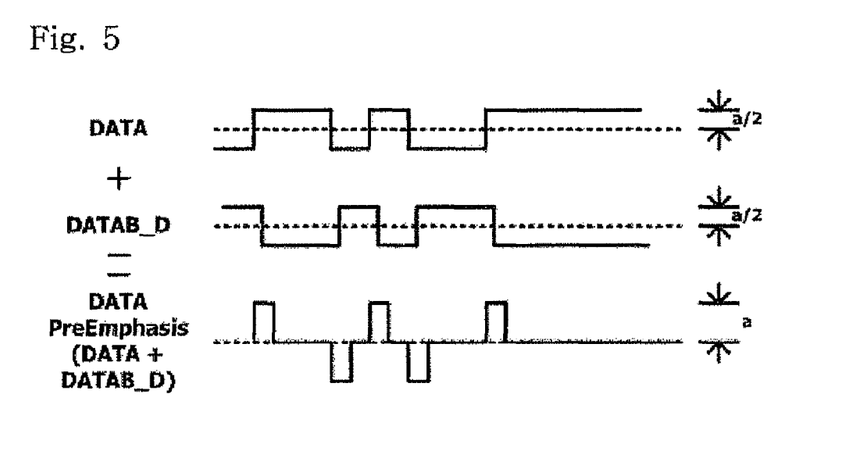
FIG. 5 is a timing diagram of a data transmission circuit which generates a pre-emphasis signal when an inductive coupling coefficient is greater than a, capacitive coupling coefficient.
Figure 6:
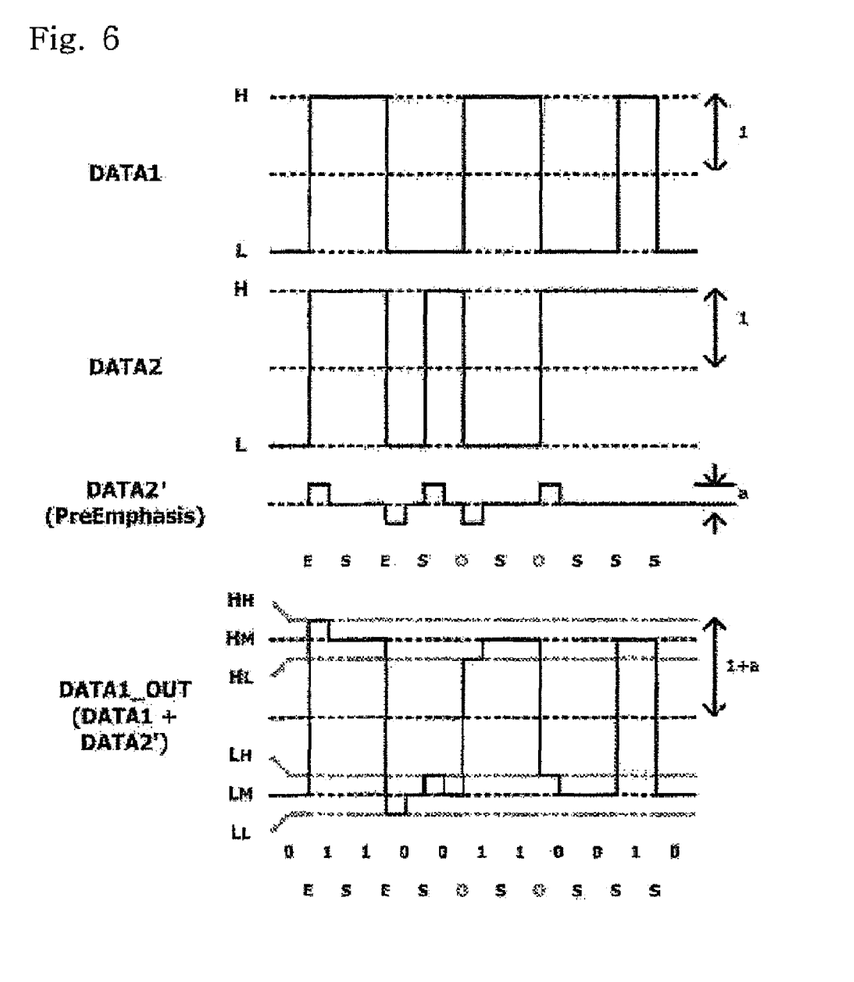
FIG. 6 is a timing diagram of a data transmission circuit which generates a pre-emphasized final output signal when an inductive coupling coefficient is greater than a capacitive coupling coefficient.
Figure 7:
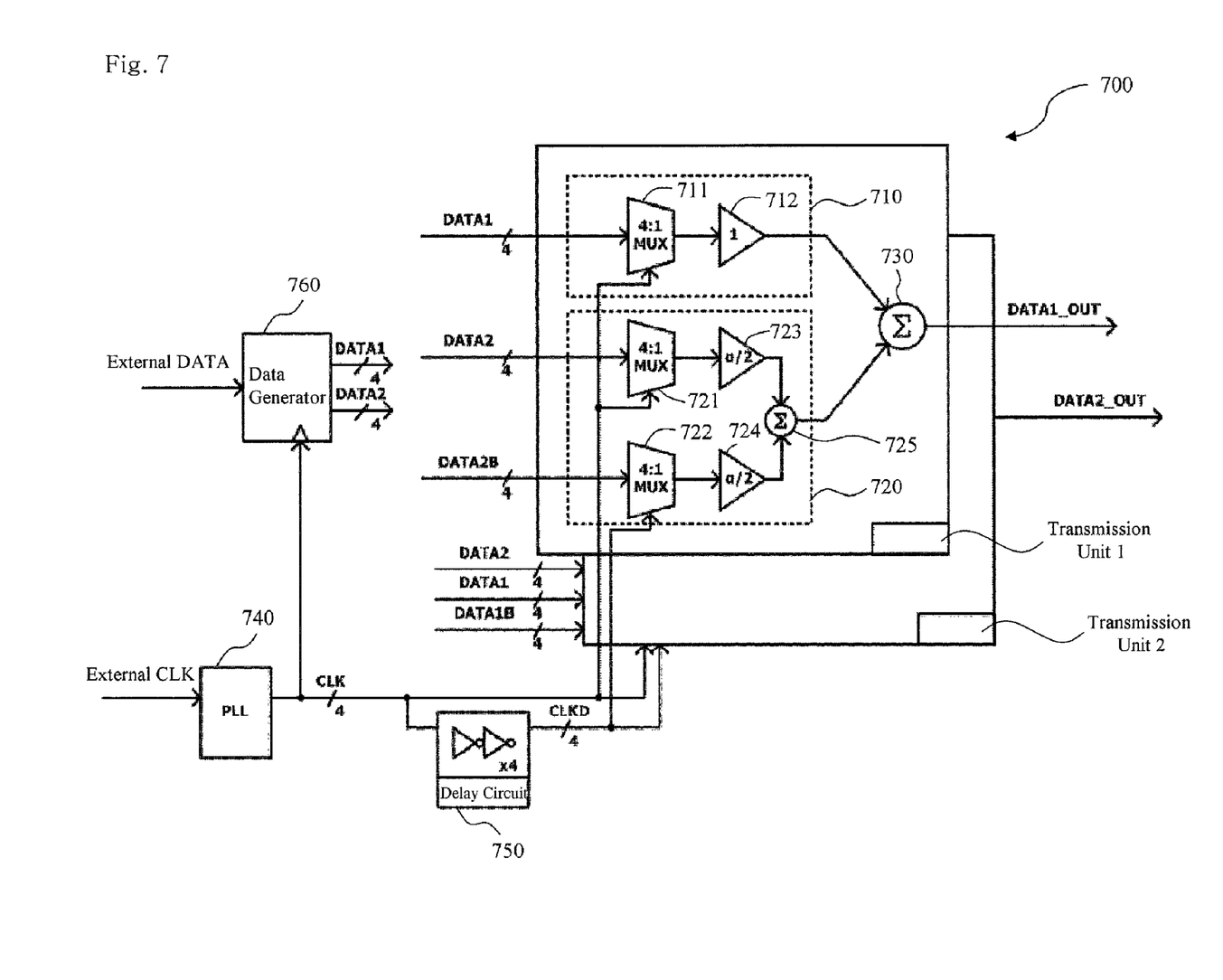
FIG. 7 is a block diagram illustrating the detailed configuration of the transmitter circuit according to the present invention in the case where two transmission lines are used when an inductive coupling coefficient is greater than a capacitive coupling coefficient.
Figure 8:
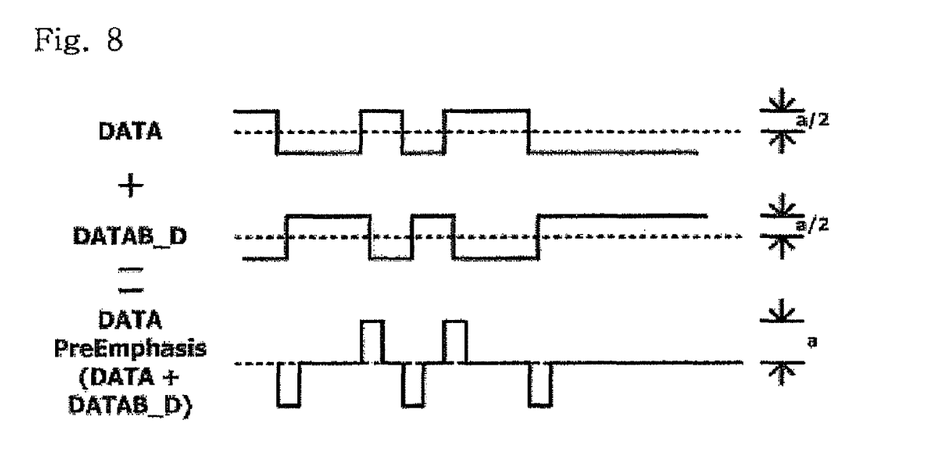
FIG. 8 is a timing diagram of a data transmission circuit which generates a pre-emphasis signal when a capacitive coupling coefficient is greater than an inductive coupling coefficient.
Figure 9:
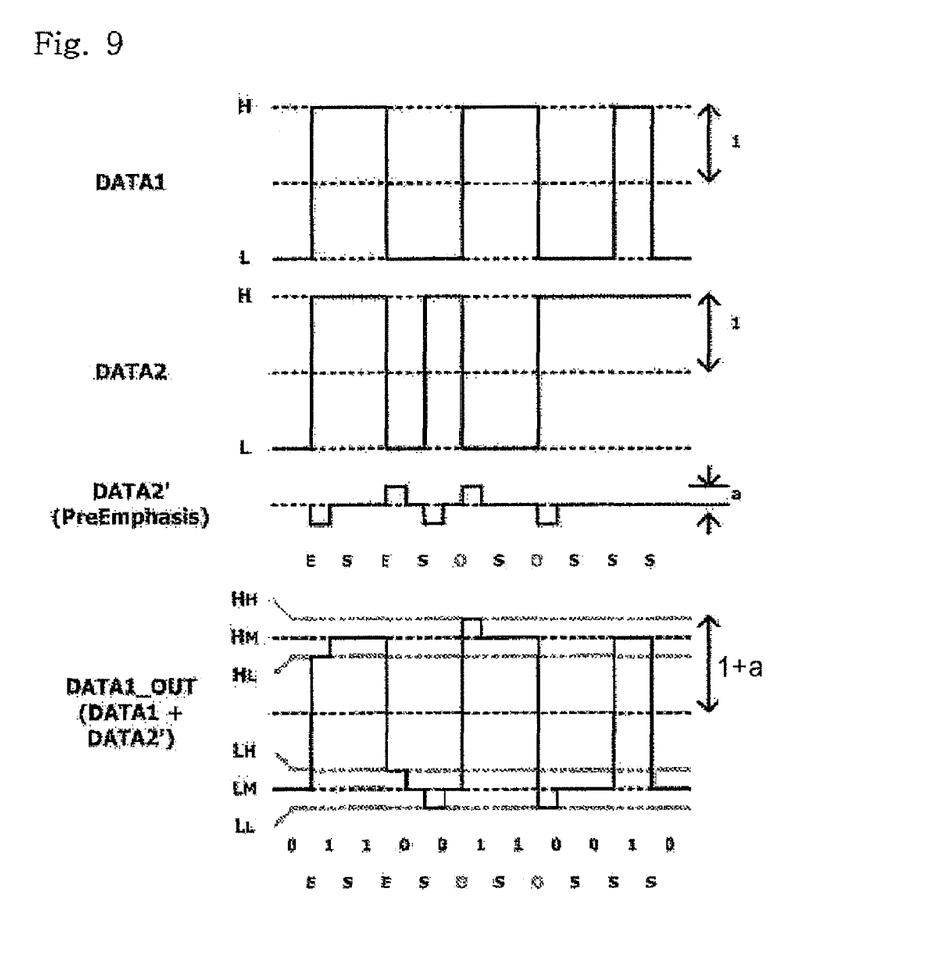
FIG. 9 is a timing diagram of a data transmission circuit which generates a pre-emphasized final output signal when a capacitive coupling coefficient is greater than an inductive coupling coefficient.
Figure 10:
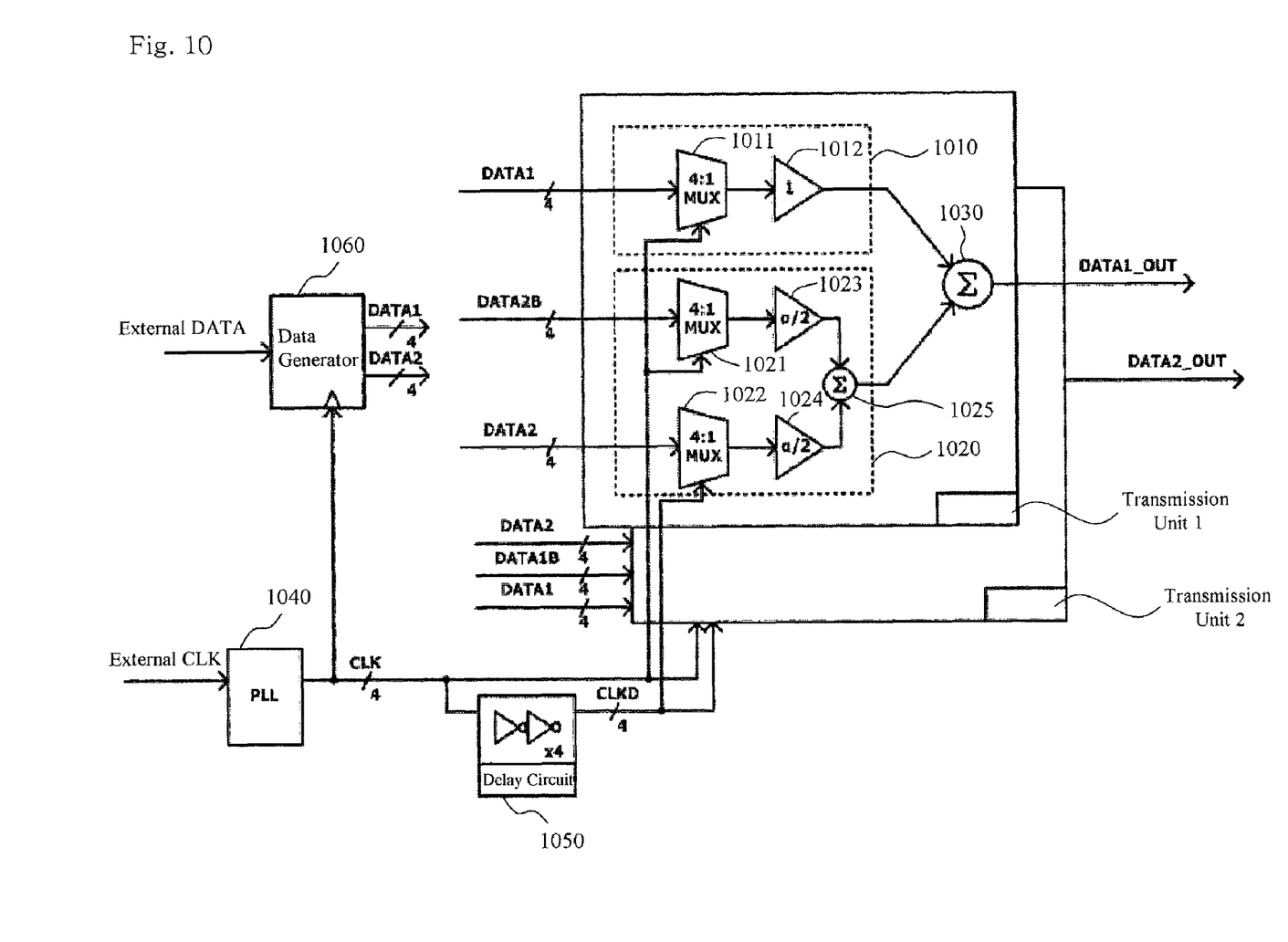
FIG. 10 is a block diagram illustrating the detailed configuration of the transmitter circuit according to the present invention in the case where two transmission lines are used when a capacitive coupling coefficient is greater than an inductive coupling coefficient.

FIGS. 5 through 7 illustrate an example of microstrip transmission lines on a printed circuit board when an inductive coupling coefficient is greater than a capacitive coupling coefficient, and FIGS. 8 through 10 illustrate an, example of microstrip transmission lines on a printed circuit board when a capacitive coupling coefficient is greater than an inductive coupling coefficient.

FIG. 5 is a timing diagram of a data transmission circuit for generating a pre-emphasis output signal. Referring to FIG. 5, by adding an inversion data DATAB_D having a delay time to one data DATA, a pre-emphasis signal as an output signal having a pre-emphasis function can be generated. This signal represents a positive output when transition occurs to a high level, a negative output when transition occurs to a low level, and no output when no transition occurs.

FIG. 6 is a timing diagram of a data transmission circuit which outputs data using a pre-emphasis function. Exemplifying the case where two output data DATA1 and DATA2 exist, a first data output signal DATA1_OUT is generated by adding a second pre-emphasis signal DATA2' to the first data DATA2.

To this end, depending upon a signal mode between the first data DATA1 and the second DATA2, as described with reference to FIG. 2, a transition output level should be made less in the case of an odd mode and greater in the case of an even mode and then be outputted.

A signal for making the level of the signal greater or less depending upon each signal mode is generated using a second pre-emphasis signal DATA2' as a pre-emphasis signal of the second data. DATA2.

When the original data DATA2 of the second DATA2 and an inversion data DATA2B_D having a delay time are added while having the same magnitude, the second pre-emphasis signal DATA2' that makes a transition output level less in the case of the odd mode and greater in the case of the even mode can be generated.

In the case where the first data DATA1 transits to a high level (DATA[n−1]=0 and DATA[n]=0 in Table 1), the first data output signal DATA1_OUT is outputted as a high-low level HL in the odd mode by making a transition output level less by using the pre-emphasis signal, as a high-high level HH in the even mode by making a transition output level greater, and as a high-middle level HM being an originally outputted level in the case of a static mode.

In the case where the first data DATA1 does not transit from a high level (DATA[n−1]=1 and DATA[n]=1 in Table 1), the first data output signal DATA1_OUT is outputted as a high-high level HH when the counterpart data DATA2 transits (rises) to a high level, as a high-middle level HM when the counterpart data DATA2 does not transit, and as a high-low level HL when the counterpart data DATA2 transits (falls) to a low level.

Also, in the case where the first data DATA1 transits to a low level (DATA[n−1]=1 and DATA[n]=0 in Table 1), the first data output signal DATA1_OUT is outputted as a low-high level LH in the odd mode by making a transition output level less by using the second pre-emphasis signal DATA2', as a low-low level LL in the even mode by making a transition output level greater, and as a low-middle level LM being an originally outputted level in the case of the static mode.

In the case where the first data DATA1 does not transit from a low level (DATA[n−1]=0 and DATA[n]=0 in Table 1), the first data output signal DATA1_OUT is outputted as a low-high level LH when the counterpart data DATA2 transits (rises) to a high level, as a low-middle level LM when the counterpart data DATA2 does not transit, and as a low-low level LL when the counterpart data DATA2 transits (falls) to a low level. These resultant transition output levels are given in Table 1.

TABLE 1

| DATA[n − 1] | DATA[n] | Mode | | Output |
|---|---|---|---|---|
| 0 | 1 | | Even | HH |
| 0 | 1 | | Static | HM |
| 0 | 1 | | Odd | HL |
| 1 | 1 | Static | Rising | HH |
| 1 | 1 | | Not Tran. | HM |
| 1 | 1 | | Falling | HL |
| 1 | 0 | | Even | LL |
| 1 | 0 | | Static | LM |
| 1 | 0 | | Odd | LH |
| 0 | 0 | Static | Rising | LH |
| 0 | 0 | | Not Tran. | LM |
| 0 | 0 | | Falling | LL |

Referring to FIG. 4, the first pre-emphasis circuit section 411 includes a first pre-emphasis circuit which adds the first data DATA1 outputted through the first transmission line and the inversion data DATA1B_D having a delay time to the same proportion depending upon a signal mode between the first transmission line and the second transmission line and outputs a first pre-emphasis signal, and generates the second data output signal DATA2_OUT by combining the first pre-emphasis signal and the output signal of the second output driving circuit section 420.

The $N^{th}$ pre-emphasis circuit section 441 includes an $N^{th}$ pre-emphasis circuit which adds the $N^{th}$ data DATAN outputted through the $N^{th}$ transmission line and the inversion data DATANB_D having a delay time to the same proportion depending upon a signal mode between the N-1$^{th}$ transmission line and the $N^{th}$ transmission line and outputs an $N^{th}$ pre-emphasis signal, and generates the N-1$^{th}$ data output signal DATAN-1_OUT by combining the $N^{th}$ pre-emphasis signal and the output signal of the N-1$^{th}$ output driving circuit section 430.

When the data transmission lines are more than three, the data outputted from the intermediate transmission line interferes with the transmission lines positioned on both sides thereof, whereby crosstalk noise is generated. Accordingly, it is necessary to control an output level depending upon signal modes in relation to the adjoining transmission lines.

To this end, the second pre-emphasis circuit section 421 includes a second-a pre-emphasis circuit 421*a* and a second-b pre-emphasis circuit 421*b*.

The second-a pre-emphasis circuit 421*a* adds the second data DATA2 outputted through the second transmission line and the inversion data DATA2B_D having a delay time to the same proportion depending upon the signal mode between the second transmission line and the first transmission line, and outputs a second-a pre-emphasis signal.

The second-b pre-emphasis circuit 421*b* adds the second data DATA2 outputted through the second transmission line and the inversion data DATA2B_D having a delay time to the same proportion depending upon the signal mode between the second transmission line and the third transmission line, and outputs a second-b pre-emphasis signal.

The N-1$^{th}$ pre-emphasis circuit section 431 includes an N-1$^{th}$ pre-emphasis circuit 431*a* and an N-1$^{th}$-b pre-emphasis circuit 431*b*.

The N-1$^{th}$-a pre-emphasis circuit 431*a* adds the N-1$^{th}$ data DATAN-1 outputted through the N-1$^{th}$ transmission line and the inversion data DATAN-1B_D having a delay time to the same proportion depending upon the signal mode between the N-1$^{th}$ transmission line and the N-2$^{th}$ transmission line, and outputs an N-1$^{th}$-a pre-emphasis signal.

The N-1$^{th}$-b pre-emphasis circuit 431*b* adds the N-1$^{th}$ data DATAN-1 outputted through the N-1$^{th}$ transmission line and the inversion data DATAN-1B_D having a delay time to the same proportion depending upon the signal mode between the N-1$^{th}$ transmission line and the $N^{th}$ transmission line, and outputs an N-1$^{th}$-b pre-emphasis signal.

The second-a pre-emphasis signal generated through the above procedure is combined with the output signal of the first output driving circuit section 410, by which the first data output signal DATA1_OUT is generated. Also, the N-1$^{th}$-a pre-emphasis signal is combined with the output signal of an N-2$^{th}$ output driving circuit section (not shown), by which an N-2$^{th}$ data output signal (not shown) is generated.

The second-b pre-emphasis signal is combined with the output signal of a third output driving circuit section (not shown), by which a third data output signal (not shown) is generated. Also, the N-1$^{th}$-b pre-emphasis signal is combined with the output signal of the $N^{th}$ output driving circuit section 440, by which an $N^{th}$ data output signal DATAN_OUT is generated.

In this way, by transmitting parallel data after compensating, in advance, for influence of crosstalk noise in a transmitter, jitter due to noise generated by crosstalk with a counterpart output signal can be reduced, whereby a time margin can be maximized in an eye diagram.

FIG. 7 is a block diagram illustrating the detailed configuration of the transmitter circuit for compensating for influence of crosstalk noise in a pre-emphasis scheme according to the present invention in the case where two transmission lines are used when an inductive coupling coefficient is greater than a capacitive coupling coefficient.

Referring to FIG. 7, the transmitter circuit for compensating for influence of crosstalk noise in a pre-emphasis scheme according to the present invention includes two output driving circuits which transmit two data DATA1 and DATA2 through two transmission lines, two pre-emphasis circuits which can control transition output levels depending upon signal modes in relation to counterpart output signals when the respective data transit, 4:1 multiplexers which output parallel data as serial data, a PLL circuit which synchronizes respective data and generates clock signals having four phases to convert parallel data into serial data, a delay circuit which delays the clock signals generated by the PLL circuit and having the four phases and generates clock signals having four delayed phases, and a data generator which generates data to be used in the two transmission lines.

Since two transmitters have the same configuration, only the case of generating the first data output signal DATA1_OUT will be described. Four parallel signals DATA1 of a first data are converted into serial data through a first-a 4:1 multiplexer 711 of a first output driving circuit section 710 and are then outputted through a first-a amplifier 712 as signals having the magnitude of 1.

Counterpart four parallel signals DATA2 are converted into serial data through a first-b 4:1 multiplexer 721 and are then converted into signals having a preset magnitude of a/2 through a first-b amplifier 723. Also, inversion data DATA2B_D having delay times of the four parallel signals DATA2 of the counterpart data are converted into serial data through a first-c 4:1 multiplexer 722 and are then converted into signals having a preset magnitude of a/2 through a first-c amplifier 724.

The signals converted through the first-b amplifier 723 to have the preset magnitude a/2 and the signals converted through the first-c amplifier 724 to have the preset magnitude a/2 are combined by a first-a adder 725 and are outputted as a pre-emphasis signal.

By combining the output signal of the first output driving circuit section 710 and the output signal of the second pre-emphasis circuit section 720, which are generated as described above, the first data output signal DATA1_OUT is outputted.

At this time, the PLL circuit 740 synchronizes the respective data and generates the clock signals having four phases to convert the respective parallel data into the serial data.

The delay circuit 750 synchronizes pre-emphasis data having respective delay times, and, in order to convert the respective parallel data into the serial data, generates the clock signals having four delayed phases by delaying the clock signals generated by the PLL circuit and having the four phases.

FIG. 8 is a timing diagram of a data transmission circuit for generating a pre-emphasis output signal when a capacitive coupling coefficient is greater than an inductive coupling coefficient.

By adding an original data DATA_D having a delay time to inversion data DATAB of a data, a pre-emphasis signal as an output signal having a pre-emphasis function can be generated. This signal represents a negative output when transition occurs to a high level, a positive output when transition occurs to a low level, and no output when no transition occurs.

FIG. 9 is a timing diagram of a data transmission circuit which outputs data using a pre-emphasis function. Exemplifying the case where two output data DATA1 and DATA2 exist, in order to generate a first data output signal DATA1_OUT as a final output by adding a second pre-emphasis signal DATA2' to the first data DATA1, depending upon a signal mode between the first data DATA1 and the second data DATA2, a transition output level should be made greater in the case of an odd mode and less in the case of an even mode and then be outputted.

A signal for making the level of the signal greater or less depending upon each signal mode is generated using the second pre-emphasis signal DATA2' as a pre-emphasis signal of the second data DATA2. When an inversion data DATA2B of the second data DATA2 and an original data DATA2_D having a delay time are added while having the same magnitude, the second pre-emphasis signal DATA2' that makes a transition output level greater in the case of the odd mode and less in the case of the even mode can be generated.

In the case where the first data DATA1 transits to a high level (DATA[n−1]=0 and DATA[n]=1 in Table 2), the first data output signal DATA1_OUT is outputted as a high-high level HH in the odd mode by making a transition output level greater by using the second pre-emphasis signal DATA2', as a high-low level HL in the even mode by making a transition output level less, and as a high-middle level HM being an originally outputted level in the case of a static mode.

In the case where the first data DATA1 does not transit from a high level (DATA[n−1]=1 and DATA[n]=1 in Table 2), the first data output signal DATA1_OUT is outputted as a high-low level HL when the counterpart data DATA2 transits (rises) to a high level, as a high-middle level HM when the counterpart data DATA2 does not transit, and as a high-high level HH when the counterpart data DATA2 transits (falls) to a low level.

Also, in the case where the first data DATA1 transits to a low level (DATA[n−1]=1 and DATA[n]=0 in Table 2), the first data output signal DATA1_OUT is outputted as a low-low level LL in the odd mode by making a transition output level greater by using the second pre-emphasis signal DATA2', as a low-high level LH in the even mode by making a transition output level less, and as a low-middle level LM being an originally outputted level in the case of the static mode.

In the case where the first data DATA1 does not transit from a low level (DATA[n−1]=0 and DATA[n]=0 in Table 2), the first data output signal DATA1_OUT is outputted as a low-low level LL when the counterpart data DATA2 transits (rises) to a high level, as a low-middle level LM when the counterpart data DATA2 does not transit, and as a low-high level LH when the counterpart data DATA2 transits (falls) to a low level. These resultant transition output levels are given in Table 2.

TABLE 2

| DATA[n − 1] | DATA[n] | Mode | | Output |
|---|---|---|---|---|
| 0 | 1 | | Even | HL |
| 0 | 1 | | Static | HM |
| 0 | 1 | | Odd | HH |
| 1 | 1 | Static | Rising | HL |
| 1 | 1 | | Not Tran. | HM |
| 1 | 1 | | Falling | HH |
| 1 | 0 | | Even | LH |
| 1 | 0 | | Static | LM |
| 1 | 0 | | Odd | LL |

TABLE 2-continued

| DATA[n − 1] | DATA[n] | Mode | | Output |
|---|---|---|---|---|
| 0 | 0 | Static | Rising | LL |
| 0 | 0 | | Not Tran. | LM |
| 0 | 0 | | Falling | LH |

FIG. 10 is a block diagram illustrating the detailed configuration of the transmitter circuit for compensating for influence of crosstalk noise in a pre-emphasis scheme according to the present invention in the case where two transmission lines are used when a capacitive coupling coefficient is greater than an inductive coupling coefficient.

Referring to FIG. 10, the transmitter circuit for compensating for influence of crosstalk noise in a pre-emphasis scheme according to the present invention includes two output driving circuits which transmit two data DATA1 and DATA2, two pre-emphasis circuits which can control transition output levels depending upon signal modes in relation to counterpart output signals when the respective data transit, 4:1 multiplexers which output parallel data as serial data, a PLL circuit which synchronizes respective data and generates clock signals having four phases to convert parallel data into serial data, a delay circuit which delays the clock signals generated by the PLL circuit and having the four phases and generates clock signals having four delayed phases, and a data generator which generates data to be used in two transmission lines.

since two transmitters have the same configuration, only the case of generating the first data output signal DATA1_OUT will be described. Four parallel signals DATA1 of a first data are converted into serial data through a first-a 4:1 multiplexer 1011 of a first output driving circuit section 1010 and are then outputted through a first-a amplifier 1012 as signals having the magnitude of 1.

Inversion signals DATA2B of counterpart four parallel signals DATA2 are converted into serial data through a first-b 4:1 multiplexer 1021 and are then converted into signals having a preset magnitude of a/2 through a first-b amplifier 1023. Also, original data DATA2_D having delay times of the four parallel signals DATA2 of the counterpart data are converted into serial data through a first-c 4:1 multiplexer 1022 and are then converted into signals having a preset magnitude of a/2 through a first-c amplifier 1024.

The signals converted through the first-b amplifier 1023 to have the preset magnitude a/2 and the signals converted through the first-c amplifier 1024 to have the preset magnitude a/2 are outputted as a second pre-emphasis signal through a first-a adder 1025.

By combining the output signal of the first output driving circuit section 1010 and the output signal of the second pre-emphasis circuit section 1020, which are generated as described above, the first data output signal DATA1_OUT is generated.

At this time, the PLL circuit 1040 synchronizes the respective data and generates the clock signals having four phases to convert the respective parallel data into the serial data.

The delay circuit 1050 synchronizes pre-emphasis data having respective delay times, and, in order to convert the respective parallel data into the serial data, generates the clock signals having four delayed phases by delaying the clock signals generated by the PLL circuit and having the four phases.

Figure 11:
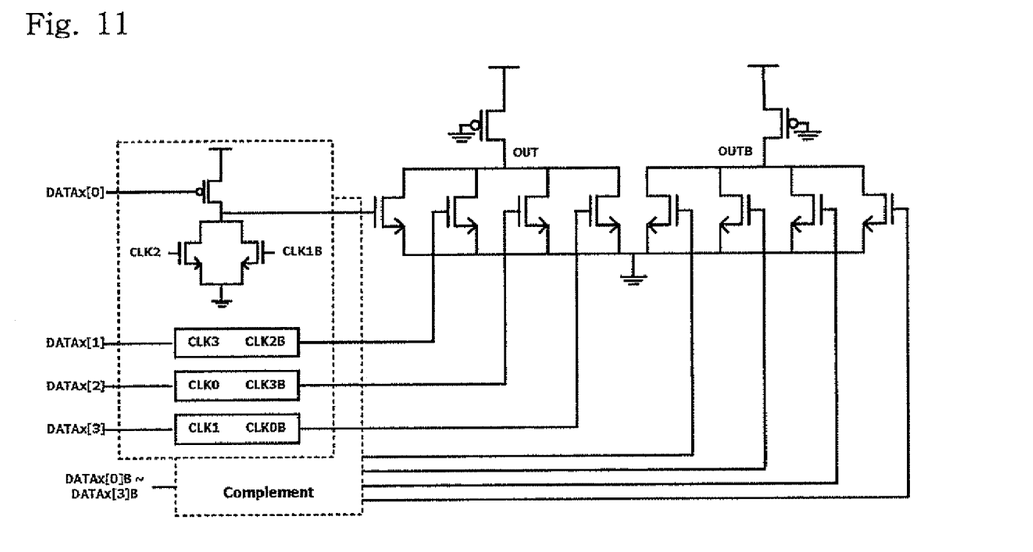
FIG. 11 is a circuit diagram of a multiplexer (MUX) according to the present invention.

FIG. 11 is a circuit diagram of a 4:1 multiplexer for converting four parallel data into one serial data. Four data DATA [0:3] are synchronized using four clock signals CLK[0:3] and are then outputted. For example, the data DATA[0] is outputted when a signal CLK1B and a signal CLK2 simultaneously have a high level. Since this structure outputs the data only using the rising edges of clock phases, the structure is efficient for making the duty of an output data to 50%.

Figure 12:
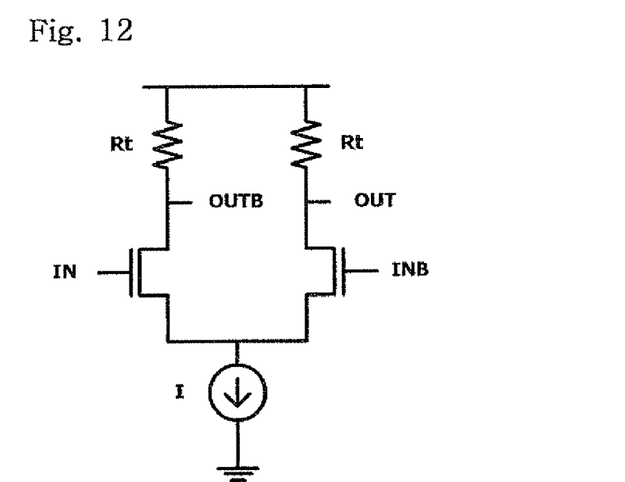
FIG. 12 is a circuit diagram of an output driving circuit section according to the present invention.

FIG. 12 is a circuit diagram of an output driving circuit section used for outputting data. When an input signal is inputted by a current source positioned below, an output signal with a preset level is outputted. At this time, an output driving circuit controls an amount of current used for pre-emphasis and determines a level at which the data is outputted. Rt designates termination resistors.

Simulation results using the transmitter circuit for compensating for jitter due to crosstalk noise between signal modes of microstrip transmission lines according to the present invention, configured as mentioned above, will be explained with reference to FIGS. 13a and 13b.

Simulations were conducted in a state in which two transmission lines having a PCB dielectric thickness of 8 mils, a width of 14 mils and an interval of 6 mils connect a transmitter and a receiver over a length of 4 inches. The transmitter comprises the transmitter circuit according to the present invention, and eye diagrams were checked in the receiver after passing through the microstrip transmission lines.

Figure 13A:
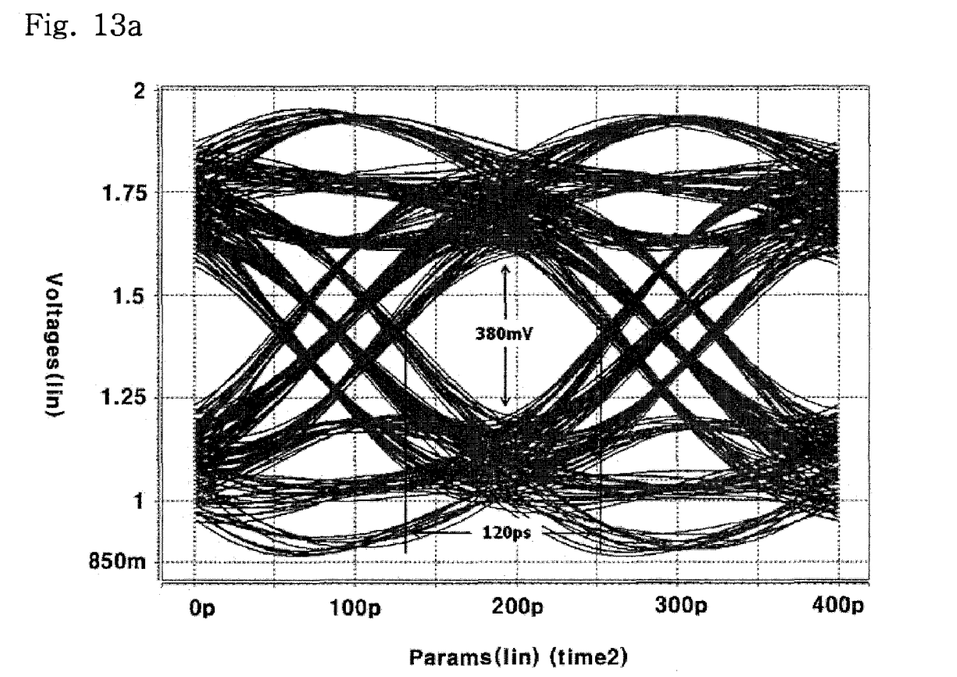
FIG. 13a is an eye diagram in a receiver in the case where the conventional transmitter is used (transmission lines: 4 inches) when an inductive coupling coefficient is greater than a capacitive coupling coefficient.
Figure 13B:
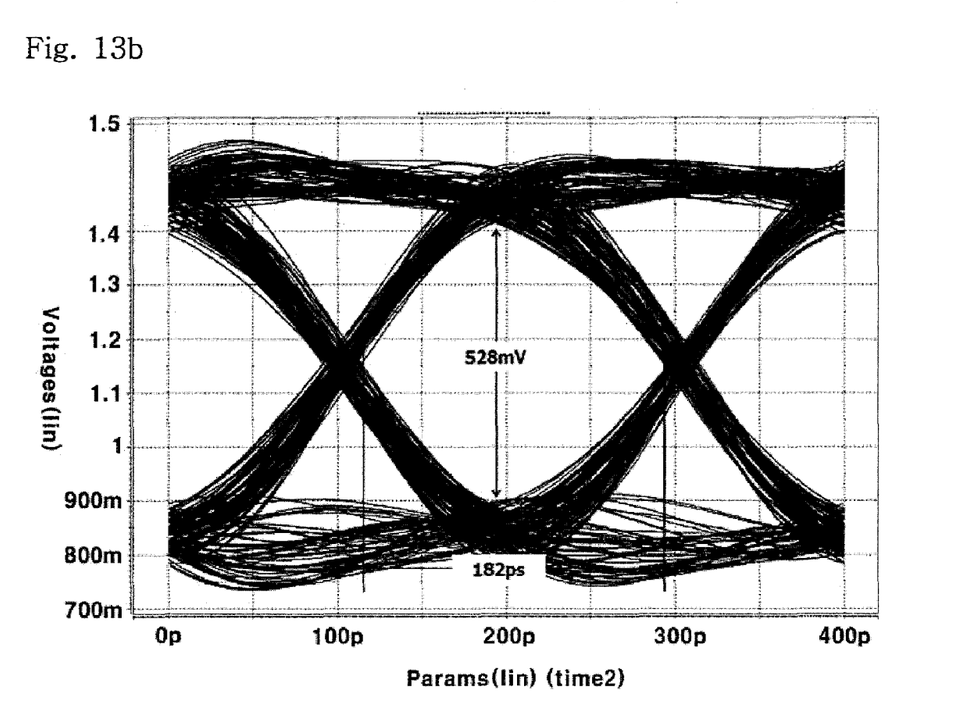
FIG. 13b is an eye diagram in a receiver in the case where the transmitter according to the present invention is used (transmission lines: 4 inches) when an inductive coupling coefficient is greater than a capacitive coupling coefficient.

FIGS. 13a and 13b are eye diagrams in a receiver of a first transmission line (shown as Transmission Unit 1 in FIG. 7) of two transmission lines in the case where the conventional transmitter and the transmitter according to the present invention are used when the length of the transmission lines is 4 inches (10 cm).

In the conventional transmitter circuit, because outputs having the same level are outputted irrespective of a signal mode, as shown in FIG. 13a, large jitter is induced in the receiver due to a difference in transmission time depending upon a signal mode when data are transmitted through transmission lines.

However, in the case of applying the transmitter circuit according to the present invention, data is outputted as a high-low level HL in the case of an odd mode when transition occurs to a high level, as a high-high level HH in the case of an even mode when transition occurs to a high level, and as a high-middle level HM being an originally outputted level in the case of a static mode.

Since the data is outputted as given in Table 1 in respective cases, as can be readily seen from FIG. 13b, a difference in time between the even mode and the odd mode, that is, timing jitter decreases in the end of the receiver, and an eye width on the eye diagram increases.

Further, compared to the case of using the conventional transmitter circuit, when the transmitter circuit according to the present invention is used, a time margin is improved on the eye diagram by about 62 ps from 120 ps to 182 ps, and, assuming 1 unit interval (UI) of 5 Gbps is 200 ps, 78% jitter is removed from 80 ps jitter to 18 ps jitter. Also, it can be appreciated that a voltage margin is improved by 148 mV from 380 mV to 528 mV. Since this value can be uniformly removed irrespective of a data rate once the structure of transmission lines is determined, high speed parallel data transmission is made possible.

As is apparent from the above description, the transmitter circuit for compensating for influence of crosstalk noise in a pre-emphasis scheme according to the present invention provides advantages in that jitter induced in a receiver by far-end crosstalk noise generated in conformity with a data mode between transmission lines for transmitting data can be reduced, and a time margin of data can be secured, whereby it is possible to improve high speed signal transmission characteristics.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A transmitter circuit for transmitting parallel data, suitable for compensating for influence of crosstalk noise in a pre-emphasis scheme, comprising:

first through $N^{th}$ transmission lines configured to respectively transmit first through $N^{th}$ data, wherein N is 2 or greater;

first through $N^{th}$ output driving circuit sections configured to output the first through $N^{th}$ data transmitted through the first through $N^{th}$ transmission lines;

first through $N^{th}$ pre-emphasis circuit sections configured to generate first through $N^{th}$ pre-emphasis signals for controlling transition output levels of the first through $N^{th}$ data depending upon signal modes of adjoining data among the first through $N^{th}$ data; and first through $N^{th}$ adders configured to generate first through $N^{th}$ data output signals that are controlled in transition output levels using output signals of the first through $N^{th}$ output driving circuit sections and the first through $N^{th}$ pre-emphasis signals, wherein the signal modes includes:

an even mode in which transition directions of adjoining data are the same;

an odd mode in which transition directions of adjoining data are different; and a static mode in which at least one of adjoining data does not transit, wherein the first pre-emphasis circuit section comprises a first pre-emphasis circuit which adds the first data outputted through the first transmission line and an inversion data of the first data having a delay time to the same proportion depending upon a signal mode between the first transmission line and the second transmission line and outputs a first pre-emphasis signal, and wherein the first pre-emphasis circuit section generates the second data output signal by combining the first pre-emphasis signal and the output signal of the second output driving circuit section.

2. The transmitter circuit according to claim 1, wherein the $N^{th}$ pre-emphasis circuit section includes an $N^{th}$ pre-emphasis circuit which adds the $N^{th}$ data outputted through the $N^{th}$ transmission line and an inversion data of the $N^{th}$ data having a delay time to the same proportion depending upon a signal mode between the N-1$^{th}$ transmission line and the $N^{th}$ transmission line and outputs an $N^{th}$ pre-emphasis signal, and wherein the $N^{th}$ pre-emphasis circuit section generates the N-1$^{th}$ data output signal by combining the $N^{th}$ pre-emphasis signal and the output signal of the N-1$^{th}$ output driving circuit section.

3. The transmitter circuit according to claim 2, wherein, when the data transmission lines are at least three, the second through N-1$^{th}$ pre-emphasis circuit sections comprise:

second-a through N-1$^{th}$-a pre-emphasis circuits which add the second through N-1$^{th}$ data outputted through the second through the N-1$^{th}$ transmission lines and inversion data of the second through N-1$^{th}$ data having delay times to the same proportion depending upon signal modes between the second through N-1$^{th}$ transmission lines and the first through N-2$^{th}$ transmission lines, and output second-a through N-1$^{th}$-a pre-emphasis signals; and second-b through N-1$^{th}$-b pre-emphasis circuits which add the second through N-1$^{th}$ data outputted through the second through the N-1$^{th}$ transmission lines and inversion data of the second through N-1$^{th}$ data having delay times to the same proportion depending upon signal modes between the second through N-1$^{th}$ transmission lines and the third through N$^{th}$ transmission lines, and output second-b through N-1$^{th}$-b pre-emphasis signals.

4. The transmitter circuit according to claim 3,
wherein the first through N-2$^{th}$ data output signals are generated by combining the second-a through N-1$^{th}$-a pre-emphasis signals and the output signals of the first through N-2$^{th}$ output driving circuit sections, and
wherein the third through N$^{th}$ data output signals are generated by combining the second-b through N-1$^{th}$-b pre-emphasis signals and the output signals of the third through N$^{th}$ output driving circuit sections.

5. The transmitter circuit according to claim 4, wherein output signals of the first through N$^{th}$ pre-emphasis circuit sections generate positive outputs when the first through N$^{th}$ data transit to a high level, negative outputs when the first through N$^{th}$ data transit to a low level, and no output when the first through N$^{th}$ data do not transit.

6. The transmitter circuit according to claim 5,
wherein, when the first through N$^{th}$ data transit to a high level, the first through N$^{th}$ data output signals are outputted as a high-low level in the case of the odd mode, as a high-high level in the case of the even mode, and as a high-middle level in the case of the static mode;
wherein, when the first through N$^{th}$ data do not transit from a high level, the first through N$^{th}$ data output signals are outputted as a high-high level when adjoining data transit to a high level, as a high-middle level when the adjoining data do not transit, and as a high-low level when the adjoining data transit to a low level;
wherein, when the first through N$^{th}$ data transit to a low level, the first through N$^{th}$ data output signals are outputted as a low-high level in the case of the odd mode, as a low-low level in the case of the even mode, and as a low-middle level in the case of the static mode; and
wherein, when the first through N$^{th}$ data do not transit from a low level, the first through N$^{th}$ data output signals are outputted as a low-high level when adjoining data transit to a high level, as a low-middle level when the adjoining data do not transit, and as a low-low level when the adjoining data transit to a low level.

7. A transmitter circuit for transmitting parallel data, suitable for compensating for influence of crosstalk noise in a pre-emphasis scheme, comprising;
first through N$^{th}$ transmission lines configured to respectively transmit first through N$^{th}$ data, wherein N is 2 or greater;
first through N$^{th}$ output driving circuit sections configured to output the first through N$^{th}$ data transmitted through the first through N$^{th}$ transmission lines;
first through N$^{th}$ pre-emphasis circuit sections configured to generate first through N$^{th}$ pre-emphasis signals for controlling transition output levels of the first through N$^{th}$ data depending upon signal modes of adjoining data among the first through N$^{th}$ data; and
first through N$^{th}$ adders configured to generate first through N$^{th}$ data output signals that are controlled in transition output levels using output signals of the first through N$^{th}$ output driving circuit sections and the first through N$^{th}$ pre-emphasis signals,
wherein the signal modes includes:
an even mode in which transition directions of adjoining data are the same;
an odd mode in which transition directions of adjoining data are different and
a static mode in which at least one of adjoining data does not transit,
wherein the first pre-emphasis circuit section comprises a first pre-emphasis circuit which adds an inversion data of the first data outputted through the first transmission line and the first data having a delay time to the same proportion depending upon a signal mode between the first transmission line and the second transmission line and outputs a first pre-emphasis signal, and
wherein the first pre-emphasis circuit section generates the second data output signal by combining the first pre-emphasis signal and the output signal of the second output driving circuit section.

8. The transmitter circuit according to claim 7,
wherein the N$^{th}$ pre-emphasis circuit section includes an N$^{th}$ pre-emphasis circuit which adds an inversion data of the N$^{th}$ data outputted through the N$^{th}$ transmission line and the N$^{th}$ data having a delay time to the same proportion depending upon a signal mode between the N-1$^{th}$ transmission line and the N$^{th}$ transmission line and outputs an N$^{th}$ pre-emphasis signal, and
wherein the N$^{th}$ pre-emphasis circuit section generates the N-1$^{th}$ data output signal by combining the N$^{th}$ pre-emphasis signal and the output signal of the N-1$^{th}$ output driving circuit section.

9. The transmitter circuit according to claim 8, wherein the second through N-1$^{th}$ pre-emphasis circuit sections comprise:
second-a through N-1$^{th}$-a pre-emphasis circuits which add inversion data of the second through N-1$^{th}$ data outputted through the second through the N-1$^{th}$ transmission lines and the second through N-1$^{th}$ data having delay times to the same proportion depending upon signal modes between the second through N-1$^{th}$ transmission lines and the first through N-2$^{th}$ transmission lines, and output second-a through N-1$^{th}$-a pre-emphasis signals; and second-b through N-1$^{th}$-b pre-emphasis circuits which add inversion data of the second through N-1$^{th}$ data outputted through the second through the N-1$^{th}$ transmission lines and the second through N-1$^{th}$ data having delay times to the same proportion depending upon signal modes between the second through N-1$^{th}$ transmission lines and the third through N$^{th}$ transmission lines, and output second-b through N-1$^{th}$-b pre-emphasis signals.

10. The transmitter circuit according to claim 9,
wherein the first through N-2$^{th}$ data output signals are generated by combining the second-a through N-1$^{th}$-a pre-emphasis signals and the output signals of the first through N-2$^{th}$ output driving circuit sections, and
wherein the third through N$^{th}$ data output signals are generated by combining the second-b through N-1$^{th}$-b pre-emphasis signals and the output signals of the third through N$^{th}$ output driving circuit sections.

11. The transmitter circuit according to claim 10, wherein output signals of the first through N$^{th}$ pre-emphasis circuit sections generate negative outputs when the first through N$^{th}$ data transit to a high level, positive outputs when the first through N$^{th}$ data transit to a low level, and no output when the first through N$^{th}$ data do not transit.

12. The transmitter circuit according to claim 11,
wherein, when the first through $N^{th}$ data transit to a high level, the first through $N^{th}$ data output signals are outputted as a high-high level in the case of the odd mode, as a high-low level in the case of the even mode, and as a high-middle level in the case of the static mode;
wherein, when the first through $N^{th}$ data do not transit from a high level, the first through $N^{th}$ data output signals are outputted as a high-low level when adjoining data transit to a high level, as a high-middle level when the adjoining data do not transit, and as a high-high level when the adjoining data transit to a low level;
wherein, when the first through $N^{th}$ data transit to a low level, the first through $N^{th}$ data output signals are outputted as a low-low level in the case of the odd mode, as a low-high level in the case of the even mode, and as a low-middle level in the case of the static mode; and
wherein, when the first through $N^{th}$ data do not transit from a low level, the first through $N^{th}$ data output signals are outputted as a low-low level when adjoining data transit to a high level, as a low-middle level when the adjoining data do not transit, and as a low-high level when the adjoining data transit to a low level.

13. A transmitter circuit for transmitting parallel data, suitable for compensating for influence of crosstalk noise in a pre-emphasis scheme, comprising:
first through $N^{th}$ transmission lines configured to respectively transmit first through $N^{th}$ data, wherein N is 2 or greater;
first through $N^{th}$ output driving circuit sections configured to output the first through $N^{th}$ data transmitted through the first through $N^{th}$ transmission lines:
first through $N^{th}$ pre-emphasis circuit sections configured to generate first through $N^{th}$ pre-emphasis signals for controlling transition output levels of the first through $N^{th}$ data depending upon signal modes of adjoining data among the first through $N^{th}$ data; and
first through $N^{th}$ adders configured to generate first through $N^{th}$ data output signals that are controlled in transition output levels using output signals of the first through $N^{th}$ output driving circuit sections and the first through $N^{th}$ pre-emphasis signals,
wherein the signal modes includes:
an even mode in which transition directions of adjoining data are the same;
an odd mode in which transition directions of adjoining data are different; and
a static mode in which at least one of adjoining data does not transit,
wherein the first through $N^{th}$ output driving circuit sections comprise:
first-a through $N^{th}$-a multiplexers configured to convert parallel data transmitted through the first through $N^{th}$ transmission lines into serial data; and
first-a through $N^{th}$-a amplifiers configured to amplify output signals of the first-a through $N^{th}$-a multiplexers to signals that have preset magnitudes.

14. The transmitter circuit according to claim 13, wherein the first through $N^{th}$ pre-emphasis circuit sections comprise:
first-b through $N^{th}$-b multiplexers configured to convert data adjoining the parallel first through $N^{th}$ data into serial data;
first-b through $N^{th}$-b amplifiers configured to amplify output signals of the first-b through $N^{th}$-b multiplexers to signals having preset magnitudes;
first-c through $N^{th}$-c multiplexers configured to convert inversion data of the data adjoining the parallel first through $N^{th}$ data having delay times into serial data;
first-c through $N^{th}$-c amplifiers configured to amplify output signals of the first-c through $N^{th}$-c multiplexers to signals having preset magnitudes; and
first-d through $N^{th}$-d adders configured to add output signals of the first-b through $N^{th}$-b amplifiers and output signals of the first-c through $N^{th}$-c amplifiers and generate the first through $N^{th}$ pre-emphasis signals.

15. The transmitter circuit according to claim 13, wherein the first through $N^{th}$ pre-emphasis circuit sections comprise:
first-b through $N^{th}$-b multiplexers configured to convert inversion data of data adjoining the parallel first through $N^{th}$ data into serial data;
first-b through $N^{th}$-b amplifiers configured to amplify output signals of the first-b through $N^{th}$-b multiplexers to signals having preset magnitudes;
first-c through $N^{th}$-c multiplexers configured to convert the data adjoining the parallel first through $N^{th}$ data having delay times into serial data;
first-c through $N^{th}$-c amplifiers configured to amplify output signals of the first-c through $N^{th}$-c multiplexers to signals having preset magnitudes; and
first-d through $N^{th}$-d adders configured to add output signals of the first-b through $N^{th}$-b amplifiers and output signals of the first-c through $N^{th}$-c amplifiers and generate the first through $N^{th}$ pre-emphasis signals.

16. The transmitter circuit according to claim 14, further comprising:
a PLL circuit configured to synchronize the first through $N^{th}$ data and generate clock signals that have phases for converting the parallel data into the serial data;
a delay circuit configured to delay the clock signals generated by the PLL circuit; and
a data generator configured to generate data to be used on the first through $N^{th}$ transmission lines.

17. The transmitter circuit according to claim 15, further comprising:
a PLL circuit configured to synchronize the first through $N^{th}$ data and generate clock signals that have phases for converting the parallel data into the serial data;
a delay circuit configured to delay the clock signals generated by the PLL circuit; and
a data generator configured to generate data to be used on the first through $N^{th}$ transmission lines.

* * * * *